United States Patent [19]

Nagy et al.

[11] 4,426,609
[45] Jan. 17, 1984

[54] POWER FACTOR CONTROLLER

[75] Inventors: Bela G. Nagy, Acton; Alfredo H. Saab, Malden, both of Mass.

[73] Assignee: Sprague Electric Company, North Adams, Mass.

[21] Appl. No.: 259,726

[22] Filed: May 1, 1981

[51] Int. Cl.³ .............................................. H02P 5/40
[52] U.S. Cl. .................................... 318/729; 318/798
[58] Field of Search ............................... 318/729, 798

[56] References Cited
U.S. PATENT DOCUMENTS 4,297,628 10/1981 Hedges .............................. 318/798
4,298,834 11/1981 Opfer .................................. 318/729

FOREIGN PATENT DOCUMENTS

WO80/02895 12/1980 PCT Int'l Appl. ................. 318/729

OTHER PUBLICATIONS

"Improved Power-Factor Controller" Marshall Space Flight Center, NASA Tech Briefs Summer 80.

*Primary Examiner*—David Smith, Jr.

[57] ABSTRACT

A power factor controller for a motor is of the type having a bidirectional triode thyristor and a circuit for sensing the voltage across the thyristor to determine the time by which the current lags the line voltage and for generating a signal voltage across an integrating capacitor that is inversely proportional to the current lag time. In addition, a voltage ramp generator produces a ramp voltage having a slope that increases as the lag time decreases. A sum of the signal voltage and ramp voltage is applied to the input of a threshold detector that triggers firing of the thyristor when a predetermined threshold is reached. The entire controller employs only five integrated switches or gates and two individual transistors, and power dissipation, size and cost are thereby minimized.

7 Claims, 13 Drawing Figures

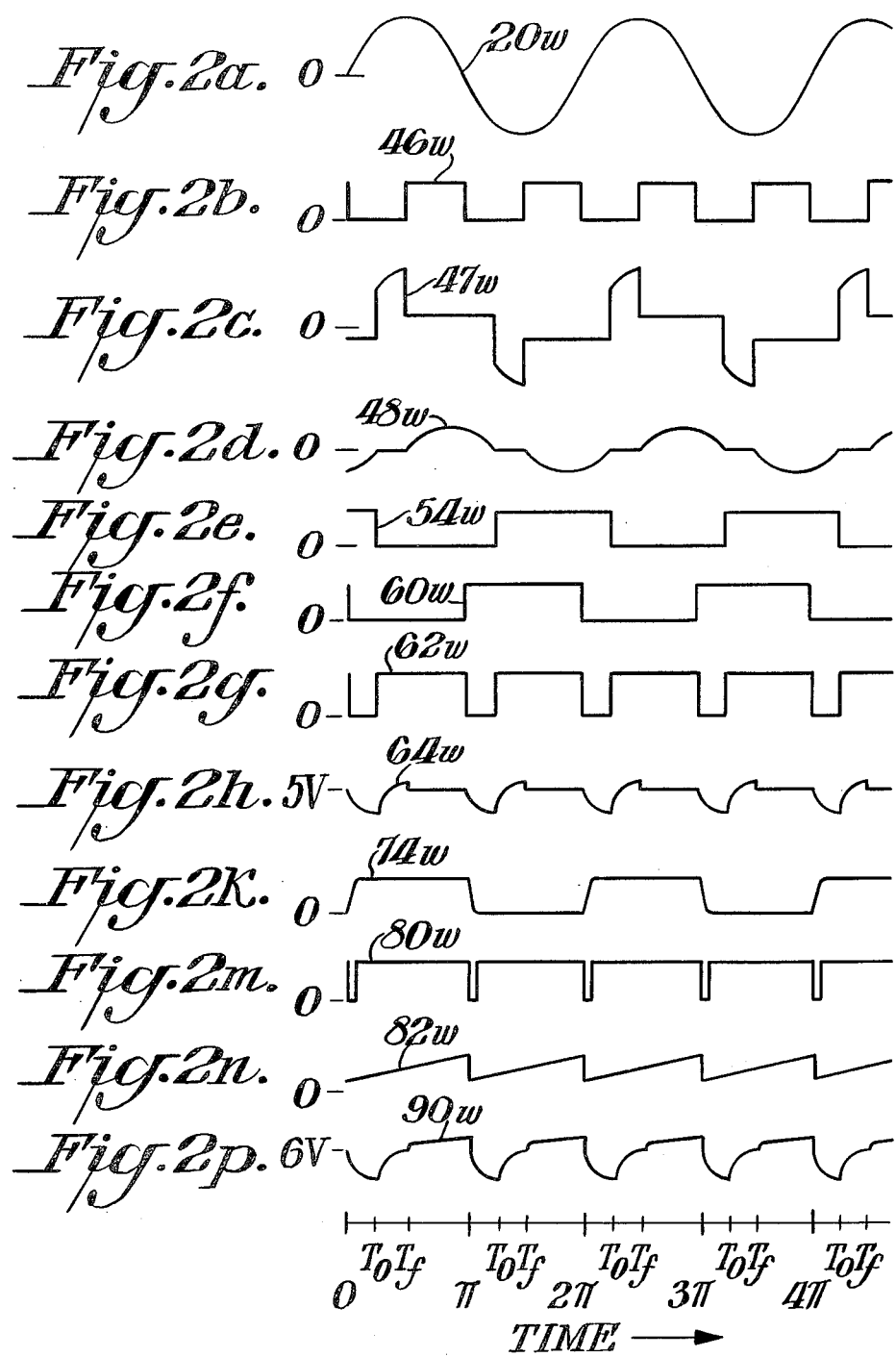

POWER FACTOR CONTROLLER

BACKGROUND OF THE INVENTION

The present invention relates to a power factor control system for AC induction motors and more particularly to such a system that electronically varies the duration of each cycle of AC power that is applied to an induction motor winding inversely with the phase lag angle of the winding current with respect to the applied voltage.

Such a system is described by F. Nola in the patent U.S. Pat. No. 4,052,648 issued Oct. 4, 1977. A high power resistor is placed in series with the motor winding to develop a voltage that is exactly in phase with the motor winding current. This resistor voltage and the line voltage are compared in an electronic circuit, e.g. including 8 operational amplifiers, that controls the firing of a bidirectional triode thyristor or TRIAC (Trademark of General Electric Company, Syracuse, N.Y.) that in turn controls delivery of the AC power to the motor winding. The above noted lag angle of the motor current is sensed and maintained essentially constant by this controller.

In a NASA publication entitled, Improved Power-Factor Controller, Brief No. MFS-23280, summer 1980, there is described a lower cost design than that in the patent. Three transformers and the high power resistor of the patent are eliminated and fewer components are used. However, two DC power supplies at +15 V and −15 V, respectively, operate from the AC power line and require two large filter capacitors. Also, only six operational amplifiers are employed.

These controller circuits have been adapted for insertion between a motor driven appliance (e.g. refrigerator, freezer, fan, etc.) and the home power outlet. They typically sell for $35. For a typical refrigerator operating at 10% duty factor, the use period required for the dollar savings in electrical energy to equal the cost of the power factor controller is at $0.08/Kwh almost 3 years. The installation of such a power factor controller with each of the several billion electric motors presently in use and with each of the approximately 50 million motors manufactured each year is clearly desirable and consistent with public policy for conserving energy, but is generally not yet cost effective in the home.

It is an object of the present invention to provide a power factor controller that is substantially simpler and less costly.

It is a further object of the present invention to provide such a controller that itself dissipates less energy and may be realized almost entirely in integrated circuit form.

It is yet a further object of the present invention to provide such a controller that is capable of being formed as an integral part of a power cord for an electrical appliance.

It is also an object of the present invention to provide such a controller that is suitable for permanent incorporation in a motor housing.

SUMMARY OF THE INVENTION

A power factor controller, intended for interposing between an induction motor and an AC power line has a thyristor switching means for connecting the motor to the line at each occurrence of a trigger voltage and disconnecting the motor at each zero crossing of the motor current.

The trigger voltage is produced by a threshold detector means when the input voltage applied thereto exceeds a predetermined value.

The controller further includes an integrating capacitor, an integrating means for generating a voltage across the integrating capacitor which voltage has a magnitude that varies inversely with the lag time by which each zero-crossing of the motor current lags the previous zero-crossing of the power line voltage. Also included is a ramping capacitor and resistor forming a series circuit which circuit is connected across the integrating capacitor so that the integrating capacitor voltage determines the slope of the ramp voltage developed across the ramping capacitor. A resetting means is for periodically discharging the ramping capacitor at each zero-crossing of the AC line voltage and the integrating capacitor voltage is the above-noted input voltage of the threshold detector. Thus, when the current lag time decreases, both the integrating capacitor voltage and the slope of the ramp voltage increases and for both reasons the threshold detector turns on earlier. This high gain relationship makes possible a considerable economy in needed circuit components. Further toward economy of size and of manufacturing cost, no linear amplifiers are needed. The preferred embodiment employs only two transistor switches and five integrated circuit gates or switches.

Operation of power factor controllers of this and the foregoing type depends upon the fact that the power factor of a lightly loaded induction motor may be improved by decreasing the applied voltage. Lightly loaded induction motors normally have a very low power factor (the current lag angle is large or from another view point the time lag by which the zero-crossing of the motor current relative to the preceding zero-crossing of the applied voltage is large). At full voltage and at the full rated mechanical load of the motor, the power factor will be high, e.g. 0.95. As the mechanical load is increased, the power factor often reaches a maximum and for most motors from there declines. Eventually the motor stalls, i.e., is in a locked rotor condition. It is important to provide full voltage under locked rotor conditions to achieve maximum stall and starting torque. As is further explained herein the power factor controller of this invention is relatively very simple, requires substantially less power itself than prior art power factor controllers and is capable of providing substantially the same high power savings when used with lightly loaded induction motors and provides essentially full power to a stalled motor as will the prior art controllers. Thus, the present invention leads to a power factor controller of substantially lower cost and size.

BRIEF DESCRIPTION OF THE DRAWING

FIGS. 2a through 2p show waveforms of the signals appearing at various points in the diagram of FIG. 1. The voltage waveforms are all given with reference to the lower side (as shown) of the power line conductor. The numerals (e.g. 16w) designating the waveforms are made by adding the letter w to the numeral identifying the corresponding conductor in FIG. 1.

DESCRIPTION OF THE PREFERRED EMBODIMENTS

Figure 1:
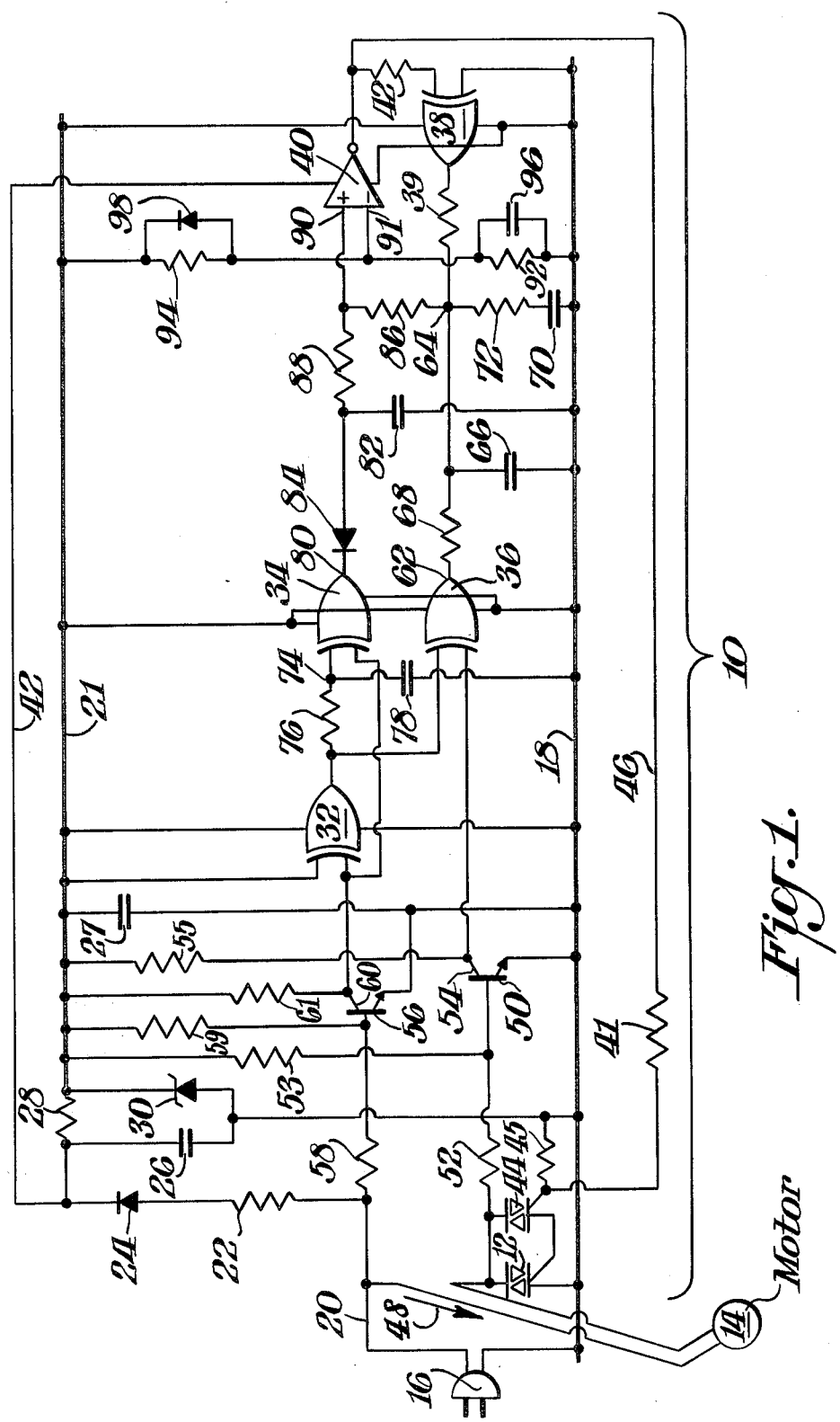
FIG. 1 shows a schematic diagram of a power factor controller of this invention that is connected to a motor.

The power factor controller 10 of FIG. 1 includes a bidirectional triode thyristor 12. Controller 10 is capable of controlling the voltage applied to a motor 14 such that the lag angle between motor current and applied voltage decreases as the mechanical load (not shown) increases.

A plug 16 is designed to be plugged into a standard 110 volt outlet. Thus with respect to the reference buss 18, the 110 volts (r.m.s.) line voltage appears at line 20 as the sine wave 20w in FIG. 2a. In the following explanation of the operation of the controller 10, this waveform 2a will be used as the time reference wherein zero-crossings of line voltage 20w occur at times 0, $\pi$, $2\pi$, $3\pi$, etc., radians or more generally at $n\pi$ where n is an integer.

A DC voltage of +10 volts appears at Vcc buss 21 derived from the circuit made up of dropping resistor 22, diode rectifier 24, smoothing capacitors 26 and 27, series resistor 28 and zener diode 30. Four C-MOS exclusive OR gates 32, 34, 36 and 38 are powered from this Vcc buss 21, whereas the operational amplifier 40 is supplied about +25 DC volts from line 42.

The bidirectional thyristor 12 is turned on each time, $T_f$, that thyristor 44 is triggered on by a positive voltage that appears on line 46. How this trigger voltage 46w of FIG. 2b is generated is explained as follows.

When thyristor 12 turns on at a time $T_f$, in a positive interval, e.g. between 0 and $\pi$, the voltage 47w, FIG. 2c, across thyristor 12 becomes about +0.6 volts. The motor current having a waveform 48w as shown in FIG. 2d, flows in the positive direction (in interval prior to the $\pi$ zero crossing), as indicated by the arrow 48 of FIG. 1. The motor 14 is inductive and causes current 48w to continue the flow after each zero voltage crossing, i.e. at a time corresponding to $n\pi$ radians.

Similarly, when thyristor 12 turns on at a time $T_f$ in a negative voltage interval, e.g. between $\pi$ and $2\pi$, the voltage 47w across thyristor 12 becomes about $-0.6$ volts and is so maintained beyond the subsequent zero-crossing, e.g. $2\pi$. In each half cycle, the thyristor voltage 47w changes polarity abruptly at the instant ($T_0$) that thyristor 12 ceases to conduct. The times $T_0$ of this abrupt change therefore corresponds to those at which the motor current 48w falls to zero. The transistor switch 50 has connected at the base a bias network made up of resistors 52 and 53. This network provides a positive bias voltage of about 1.0 volts added to the thyristor voltage 47w. This sum voltage appears at the base of transistor 50. Thus transistor 50 is on when a positive motor current 48w flows, abruptly turning off at time $T_0$ when the current 48w terminates. But transistor 50 is off when a negative motor current 48w flows, abruptly turning on at the time $T_0$. Thus at the collector 54 of transistor 50 a voltage waveform 54w appears as in FIG. 2e. This voltage changes state at each instant $T_0$, and only then.

The transistor switch 56 is turned on during positive half cycles and turned off during negative half cycles of the power line (waveform 20w). The bias network made up of resistors 58 and 59 provide a positive bias voltage of about one volt at the base of transistor 56 to compensate for the $V_{BE}$ threshold thereof and to cause more perfect synchronism between the turning on and off of transistor 56 with the times ($n\pi$) of zero crossing of the power line voltage 20w. The square wave voltage 60w (FIG. 2f) at the collector 60 of transistor 56 is thus $\pi$ radians out of phase with the power line voltage. This voltage 60w (FIG. 2f) is applied to one of the inputs of the inverting gate 32 which presents a square wave to an input of the exclusive OR gate 36 that is in phase with the power line voltage.

The other signal input to gate 36 is the voltage 54w (FIG. 2e) from the collector 54 of transistor 50. Thus at the output 62 of exclusive OR gate 36 there is generated a positive voltage 62w (FIG. 2g) that at every zero crossing $n\pi$ of the power line voltage 20w goes to zero and remains zero until the next time $T_0$ at which motor current 48w has dropped to zero.

The circuit node 64 can be considered a summing point for the signals generated at the outputs of the C-MOS exclusive OR gates 36 and 38. The voltage waveform 64w is illustrated in FIG. 2h. The output voltage 62w of gate 36 is near zero from the time of each zero crossing $n\pi$ to the time $T_0$ that the lagging motor current drops to zero. At $T_0$, voltage 62w jumps to the +10 volts of buss 21. Time delay capacitor 66 and series resistor 68 have a time constant of about 2 milliseconds while the much larger capacitor 70 charges through resistor 72 and resistor 68 at a characteristic time constant of about 100 milliseconds, corresponding to 12 half cycles of the power line voltage. Resistor 72 has a relatively small value. Capacitor 66 is not essential but adds stability of the circuit when transients occur. The magnitude of the voltage 64w is thus an inverse function of the lag time $T_0$ and in this embodiment, an integrating means is comprised of the components 50, 52, 53, 54, 55, 56, 58, 59, 61, 32, 36, 68, 66, 72 and 70.

Exclusive OR gate 34 has at one input the voltage 60w (FIG. 2f) that is $2\pi$ radius out of phase with the power line voltage 20w. The other input 74 to gate 34 is a waveform 74w as in FIG. 2k that is in phase with the power line voltage but slightly (about 100 $\mu$sec) delayed by the network made up of resistor 76 and capacitor 78. Thus the output waveform 80w, FIG. 2m at the output 80 of gate 34 is at +10 volts except for 100 $\mu$sec at each zero crossing ($n\pi$) when it is at zero volts. During that short time, positive charge accumulated on timing capacitor 82 is drained off through diode 84.

Thereafter, capacitor 82 charges, as in the ramp voltage waveform 82w of FIG. 2n toward the voltage appearing at node 64 through resistors 86 and 88. These components may be designated ramping capacitor 82 and resistors 86 and 88, respectively. When, at Tw, the voltage 90w, FIG. 2p at the input 90 of switching amplifier 40 exceeds that of the threshold voltage at its input 91, amplifier 40 turns on, producing a positive step voltage at line 46 to turn on the bidirectional triode thyristor 44 and in turn thyristor 12. The threshold bias voltage at input 91 is about 6 volts established by resistors 92 and 94, capacitor 96 and diode 98. In this way the delayed thyristor 12 firing time, $T_f$, taken with reference to the corresponding (preceding) zero crossing $n\pi$ of the power line voltage, is inversely related to the voltage at node 64.

Furthermore, the ramp slope of voltage waveform 82w becomes greater when the voltage at node 64 becomes greater, which occurs when over many cycles the lag time $T_0$ of the motor current 48w becomes smaller. A steeper ramp voltage 82w effects the turning on of thyristor 12 at an even earlier time ($T_f$), which may be more generally viewed as a means for increasing the "gain" of firing time $T_f$ to lag time $T_0$ and enabling considerable simplification of the circuit.

A positive feedback circuit is employed in the controller of this invention, namely the CMOS gate 38 and resistor 39 that are connected around amplifier 40. The output from gate 38 is a step of current through resistor 39 to node 64 (e.g. 20 v/180 KΩ≈0.10 ma.) that occurs from $T_w$ to the next nπ. This positive feedback embues the threshold detecting amplifier 40 with a hysteresis characteristic whereby the step of current charges capacitor 70 through resistor 72 to produce a step of voltage thereacross and to lock amplifier 40 in the "on" state. The presence or absence of positive feedback components 38 and 39 will not change the $T_f/T_0$ gain or the initial threshold of the amplifier 40. It only changes the width of the input hysteresis characteristic of the detector portion of the circuit (including components 92, 94, 40, 38 and 39). The greater the positive feedback, e.g. achieved by reducing the value of resistor 39, the greater will be the width of the hysteresis, i.e., the lag time $T_0$ at which the detector will turn off is increased.

An optimum adjustment of the amount of positive feedback can be made for a particular motor, specifically that adjustment for which full voltage is reliably (without oscillation or hunting) applied to the motor in the locked rotor condition. This adjustment should be made after an optimum adjustment of detector threshold is made, e.g. by varying the value of resistor 92 and thus the DC voltage at input 91 so that the detector threshold is set at a value just above that for which hunting of the system tends to occur for a medium to heavy range of mechanical loads on the motor. The tendency for hunting in the system will be much less for some induction motors than in others for which the characteristic power factor versus mechanical load for such motors peaks as load increases and drops severely when stalling (locked rotor condition) is approached. A fixed conservative setting may be made of threshold and feedback in the power factor controller so that a wide variety of motors can be powered from it without risk of instability. However, such a fixed setting will always provide less power savings at such a conservative setting.

The very simple circuit of the present invention is capable of being produced with such a conservative fixed setting providing about as great a power savings with any particular motor as will a similarly adjusted but much more complex power factor controller of the prior art. This is in part due to the novel variable slope ramp feature of this invention that for light to medium heavy loads produces an almost constant current lag angle.

A power factor controller circuit was assembled that including Triacs, Triac heat sinks, and all components of FIG. 1, that measures 1.5×2×10.75 inches. This controller was connected in turn to six fractional horsepower motors. Optimum adjustments having been made for connections to the motor most prone to hunt, a Dayton 5K280A rated at ¼ horsepower, the power delivered from the AC line was measured at light to heavy loads with and without the controller and the results are briefly shown in Table II.

TABLE II

| INPUT WATTS | |
|---|---|
| with P.F.C. | without P.F.C. |
| 65 | 165 |
| 500 | 600 |

TABLE II-continued

| INPUT WATTS | |
|---|---|
| with P.F.C. | without P.F.C. |
| 50 | 990 |

The power consumption of this experimental controller is 0.85 watts excluding the Triacs while that of the prior art controllers is approximately five times as much. The low power consumption and simple circuitry of the controller of this invention make realization in silicon integrated circuit form practical and costs will be a small fraction of those known heretofore.

The component values are given in Table I

TABLE I

| Resistors | | | | | |
|---|---|---|---|---|---|
| No. | Value (K ohms) | Rating (watts) | No. | Value (μfd) | Rating (volts) |
| | | | Capacitors | | |
| 22 | 6.8 | 1 | 26 | 47 | 25 |
| 28 | 10 | ¼ | 27 | 0.1 | 50 |
| 37 | 470 | ¼ | 66 | 0.1 | 50 |
| 39 | 130 | ¼ | 70 | 4.7 | 16 |
| 41 | 2.7 | ¼ | | | |
| 42 | 100 | ¼ | | | |
| 45 | 1 | ¼ | 78 | 0.001 | 50 |
| 52 | 100 | ¼ | 82 | 0.1 | 50 |
| 53 | 1000 | ¼ | 96 | 4.7 | 16 |
| 55 | 100 | ¼ | | | |
| 58 | 220 | ¼ | Transistors | | |
| 59 | 2200 | ¼ | 50 | 2N3904 | |
| 61 | 100 | ¼ | 56 | 2N3904 | |
| 68 | 22 | ¼ | | | |
| 72 | 3.9 | ¼ | Diodes | | |
| 76 | 100 | ¼ | 24 | 1N4004 | |
| 86 | 22 | 1.4 | 84 | 1N914 | |
| 88 | 100 | ¼ | 98 | 1N914 | |
| 92 | 100 | ¼ | | | |
| 94 | 68 | ¼ | Zener | | |
| | | | 30 | 1N5856B | |
| | | | I.C.s | | |
| | | | 32 | CD4070 | |
| | | | 34 | ¼ CD4070 | |
| | | | 36 | ¼ CD4070 | |
| | | | 38 | ¼ CD4070 | |
| | | | 40 | μA741 | |

What is claimed is:
1. A power factor controller for being interposed between an induction motor and an AC power line comprising:
(a) an integrating means including an integrating capacitor for charging and generating across said integrating capacitor a voltage having a magnitude that is inversely related to the lag time by which the current of said motor periodically reaches zero later than a preceding zero crossing of the AC power line voltage; said integrating means comprising a signal generator means for generating a signal voltage having a predetermined value during each half period of said AC power line except that it becomes near zero volts at each instance of zero crossing of said power line voltage and remains zero until the following zero crossing of said motor current, and a current limiting resistor, said signal generating means being connected through said current limiting resistor to said integrating capacitor;
(b) a ramping capacitor and resistor forming a series circuit that is connected across said integrating capacitor so that the voltage appearing across said integrating capacitor serves to charge said ramping capacitor and to determine the slope of the resulting ramp voltage developed thereacross;

(c) a resetting means for periodically discharging said ramping capacitor at each time of zero crossing of said AC line voltage;

(d) a detector-threshold means for detecting the sum of said ramp voltage and said integrating capacitor voltage and producing a trigger voltage when said voltage sum reaches a predetermined threshold value;

(e) a bidirectional triode thyristor for connecting said motor to said AC power line at each occurrence of said trigger voltage and disconnecting said motor at each occurrence at which said motor current falls to zero; and (f) a DC power supply means; said signal generator means comprising a first grounded-emitter-type transistor amplifier stage powered from said DC supply means having a first bipolar transistor and a first base resistor, said first resistor being connected between the base of said first transistor and the anode/cathode of said thyristor and the cathode/anode of said thyristor being connected to the emitter of said first transistor; and a second grounded-emitter type transistor amplifier stage powered from said DC supply means having a second bipolar transistor and a second base resistor, the base and the emitter of said second transistor adapted to be connected to two lines respectively of said AC power line through said second resistor; and an exclusive OR gate means for producing said signal voltage of a predetermined non-zero value during said each half AC voltage period when the signals at the collectors of said first and second transistors are the same, and for otherwise producing said near zero voltage.

2. The power factor controller of claim 1 wherein said resetting means comprises a diode being connected in a series discharge circuit with said ramping capacitor, said discharge circuit being connected across the output of said signal generating means in such a polarity that said ramping capacitor is discharged through said diode when said signal voltage is near zero, so that each ramp of said ramping voltage starts at a later time with respect to said preceding zero crossing of said AC power line voltage when said motor current lag time increases.

3. The power factor controller of claim 1 wherein the time constant of said integrating capacitor with said current limiting resistor is at least as long as four periods of said AC power line voltage, and the time constant of said ramping circuit is about one period of said AC power line voltage.

4. The power factor controller of claim 1 wherein said resetting means comprises: a pulse generator means for, at each occurrence of said zero crossing of said AC line voltage, applying a low impedance across said ramping capacitor for a predetermined fixed time, so that each ramp of said ramping voltage begins at a fixed time after each said zero crossing of said AC line voltage.

5. The power factor controller of claim 1 wherein said detector threshold means is comprised of a differential input single ended output type amplifier and a dc bias supply being connected to one input of said differential amplifier to establish said predetermined threshold value.

6. The power factor controller of claim 4 additionally comprising a positive feedback amplifier means for adding charge and accelerating said charging of said integrating capacitor during each interval between initiation of said trigger voltage and the following zero crossing of said AC power line voltage and for adding a step voltage rise to said voltage sum to provide in effect a hysteresis characteristic to said detector threshold means and avoid the inadvertent discontinuance of said charging of said integrating capacitor due especially to the tendency of a controlled motor to hunt and oscillate when under relatively heavy loads.

7. The power factor controller of claim 1 wherein said integrating means, resetting means and detector-threshold means each include transistors, all of said transistors being adapted to operate only in a switching mode.

* * * * *

UNITED STATES PATENT AND TRADEMARK OFFICE
CERTIFICATE OF CORRECTION

PATENT NO. : 4,426,609
DATED : January 17, 1984
INVENTOR(S) : Bela G. Nagy et al It is certified that error appears in the above—identified patent and that said Letters Patent is hereby corrected as shown below:

Cover page, under "[56] References Cited - U.S. PATENT DOCUMENTS", the following U.S. patent should be listed:
-- 4,052,648     10/1977 -     Nola     318/200 --

Claim 6, line 1, "claim 4" should read -- claim 5 --

Signed and Sealed this

Eighth Day of May 1984

[SEAL]

Attest:

GERALD J. MOSSINGHOFF

Attesting Officer

Commissioner of Patents and Trademarks